United States Patent
Dawson et al.

(10) Patent No.: US 6,767,868 B2
(45) Date of Patent: *Jul. 27, 2004

(54) BREAKER SYSTEM FOR FRACTURING FLUIDS USED IN FRACTURING OIL BEARING FORMATIONS

(75) Inventors: Jeffrey Dawson, Spring, TX (US); Subramanian Kesavan, East Windsor, NJ (US); Hoang Van Le, Spring, TX (US)

(73) Assignee: BJ Services Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 74 days.

(21) Appl. No.: 09/791,042

(22) Filed: Feb. 22, 2001

(65) Prior Publication Data

US 2002/0160920 A1 Oct. 31, 2002

(51) Int. Cl.$^7$ .............................. C09K 3/00; E21B 43/26
(52) U.S. Cl. ...................... 507/236; 507/237; 507/209; 507/211; 507/241; 507/271; 507/902; 507/922; 166/308
(58) Field of Search ................................ 507/209, 211, 507/236, 237, 271, 902, 922, 241, 269; 166/308

(56) References Cited

U.S. PATENT DOCUMENTS

| | | | |
|---|---|---|---|
| 4,153,649 A | 5/1979 | Griffin, Jr. ................. 260/950 |
| 4,202,795 A | 5/1980 | Burnham et al. ........... 252/332 |
| 4,741,401 A | 5/1988 | Walles et al. ............... 166/300 |
| 4,770,796 A * | 9/1988 | Jacobs ........................ 507/902 |
| 4,795,574 A | 1/1989 | Syrinek et al. .......... 252/8.551 |
| 5,223,159 A * | 6/1993 | Smith et al. ................ 507/902 |
| 5,497,830 A | 3/1996 | Boles et al. ................ 166/300 |
| 5,624,886 A | 4/1997 | Dawson et al. ............ 507/217 |
| 5,693,837 A | 12/1997 | Smith et al. ................ 556/148 |
| 5,813,466 A | 9/1998 | Harris et al. ............... 166/300 |
| 5,950,731 A | 9/1999 | Shuchart et al. ........... 166/300 |
| 6,326,335 B1 * | 12/2001 | Kowalski et al. .......... 507/902 |
| 6,357,527 B1 * | 3/2002 | Norman et al. ............ 507/902 |

* cited by examiner

Primary Examiner—Philip C. Tucker
(74) Attorney, Agent, or Firm—Charles D. Gunter, Jr.

(57) ABSTRACT

A method of fracturing a zone of a subterranean formation penetrated by a well bore is shown in which a gelable fracturing fluid is formed by combining an aqueous base fluid and a hydratable polymer. A transition metal crosslinker is added to the aqueous base fluid for crosslinking the hydratable polymer to form a gelled fluid of sufficient viscosity to facilitate fracturing of the formation. A proppant can also be added to the gelable fracturing fluid. The gelled fluid and proppant are then injected into the well bore and into contact with the formation under sufficient pressure to fracture the formation. The gelable fracturing fluid has incorporated therein a delayed release breaker comprising a complex multivalent chelating agent that is released slowly over a period of time to compete with the polymer for the transition metal crosslinker, thereby reducing the viscosity of the fluid.

23 Claims, No Drawings

BREAKER SYSTEM FOR FRACTURING FLUIDS USED IN FRACTURING OIL BEARING FORMATIONS

BACKGROUND OF THE INVENTION

1. Field of the Invention

The present invention relates to fracturing fluids of the type used to fracture subterranean formations and, more particularly, to a method for breaking a fracturing fluid through the use of a time release chelating agent incorporated within the viscosified fluid used in fracturing relatively low temperature formations.

2. Description of the Prior Art

During the drilling of a well and the subsequent recovery of fluids from the well such as crude oil and natural gas, various materials are used to improve the efficiency of the well drilling operation, to increase the production of fluids from the formation and/or to plug or seal a non-producing well. For example, a subterranean formation is often subjected to a fracturing treatment to enhance the recovery of fluids such as crude oil or natural gas. During hydraulic fracturing, a sand or proppant laden fluid is injected into a well bore under pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such as a suitable polysaccharide. A properly viscosified fluid provides the transport properties needed for proper placement of the propping agent within the fracture thus produced. The proppant remains in the produced fracture to prevent the complete closure of the fracture and to form a conductive channel extending from the well bore into the formation being treated once the fracturing fluid is recovered.

The recovery of the fracturing fluid is accomplished by reducing the viscosity of the fluid to a low value such that it flows naturally from the formation under the influence of formation fluids. This viscosity reduction or conversion is referred to as "breaking" and can be accomplished by incorporating chemical agents, referred to as breakers, into the initial gel.

In addition to the importance of providing a breaking mechanism for the gelled fluid to facilitate recovery of the fluid and resume production, the timing of the break is also of great importance. Gels which break prematurely can cause suspended proppant material to settle out of the gel before being introduced a sufficient distance into the produced fracture. Premature breaking can also result in a premature reduction in the fluid viscosity resulting in a less than desirable fracture width in the fracture being created.

On the other hand, gelled fluids which break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured. Thus, to be satisfactory, gel viscosity should remain in excess of 200 centipoise viscosity at 40 $sec^{-1}$ at the same temperature over the entire time, usually between one and eight hours, that is required to pump the fluid into the fracture.

Optimally, the fracturing gel will begin to break when the pumping operations are concluded. For practical purposes, the gel should be completely broken within about 24 hours after completion of the fracturing treatment. A completely broken gel will be taken to mean one that can be flushed from the formation by the flowing formation fluids or that can be recovered by a swapping operation. In the laboratory setting, a completely broken, non-crosslinked gel is one whose viscosity is about 10 centipoise or less as measured on a Model 35 FANN viscometer at 300 rpm or less than 100 centipoise by Brookfield viscometer.

The controlled degradation of water soluble polysaccharides, used as viscosifying agents in hydraulic fracturing treatments of oil and gas wells, is thus an important consideration in a successful fracturing job. Historically, persulfate salts or other oxidants were added to the fracturing fluid to cause viscosity loss due to polymer degradation. Laboratory evaluations are made before the treatment to find the persulfate concentration necessary to cause a reasonable viscosity decline. However, fracture conductivity studies have recently shown that the recommended persulfate concentrations are routinely inadequate to remove the residual fluid's impairment of the proppant pack.

Various methods have been proposed to control the break mechanism of the prior art breaker systems. One proposed method for controlling the activity of the breaker is described in U.S. Pat. No. 4,202,795 to Burnham et al. in which the breaker is introduced into the subterranean formation in the form of a prill or pellet formed by combining gel degrading substances with a hydratable gelling agent and forming the resulting mixture into the desired prill or pellet form. Upon exposure of the prills or pellets to an aqueous fluid, the gelling agent is said to hydrate and form a protective gel around each of the pellets, thereby preventing the release of the breaker into the aqueous fluid until the protective gel is broken by the gel-degrading substance. The cited reference claims that the breaker can be released to the aqueous fluid in a controlled manner by the described mechanism. It appears that a relatively large amount of the hydratable gelling agent is required to prepare the pellets and that the amount of hydratable gelling agent must be carefully controlled. In addition, the time period over which the pellets are released may vary substantially.

U.S. Pat. No. 4,506,734 to Nolte describes another method for delaying the release of a breaker by introducing a viscosity reducing chemical contained within hollow or porous, crushable beads into a hydraulic fracturing fluid. The viscosity reducing agent is said to be released upon the crushing of the beads which results from the closing of the fractures, caused by the fracturing fluid passing or leaking off into the formation or by removing the fluid by backflowing. However, stresses caused by the closing of the formation affect the percentage of beads being crushed so that a large percentage of beads may remain unbroken, particularly if the formation closes at a slow rate. Also, a large percentage of the beads may be crushed in one area of the formation being treated, whereas a secondary area of the formation may contain a substantially lower amount of beads to be crushed with resulting inconsistent performance.

A recent purported improvement to the above processes is described in U.S. Pat. No. 4,741,401 to Walles et al. in which an oxidant granule is encapsulated within a polymeric coating. The coating initially isolates the persulfate oxidant from the gelled fluid to minimize immediate viscosity declines while also allowing the granule to plate out in the filter cake. This places the oxidant in the filter cake to eventually degrade the polysaccharide both in the fluid and the filter cake. The persulfate is reportedly released by both permeation through the coating and by the crushing of the pellet by the proppant during fracture closure.

The controlled release of oxidants to break the viscosity of the fracturing fluid is also disclosed by Dawson et al., U.S. Pat. No. 5,624,886, assigned to the assignee of the present invention. The oxidant is agglomerated with a silicate into a pellet for slow release into the formation. In addition to the traditional oxidant, the pellets can also contain some chelating agents. The disadvantage to this method, however, is that oxidizers cannot be used at relatively low temperatures, i.e., below 150° F.

Boles et al. in U.S. Pat. No. 5,497,830, also assigned to the assignee of the present invention, discloses a method of breaking acidic fracturing fluids using a chelating agent, the agent selected from a group consisting of simple fluoride, phosphate, sulfate, and multi-carboxylated compounds. This method does not disclose the specific method of using more complex multivalent chelators such as phosphonates in a non-acidic basic fracturing fluid, however.

What is needed is an improved method of breaking viscosified gels used in formation fracturing that can be used at temperature ranges of 80–250° F. and in pH ranges of 3–11 and which provides improved retained formation conductivity over presently known methods.

SUMMARY OF THE INVENTION

The present method of fracturing a zone of a subterranean formation penetrated by a well bore includes the steps of first forming a gelable fracturing fluid by combining an aqueous base fluid and a hydratable polymer, the pH of the gelable fracturing fluid is in the range from about 3–12 and is preferably greater than about 7. A transition metal crosslinker is added to the aqueous base fluid for crosslinking the hydratable polymer to form a gelled fluid of sufficient viscosity to facilitate fracturing of the formation. The gelable fracturing fluid also has incorporated therein as a primary break mechanism a delayed release breaker comprising a chelating agent that is released slowly over a period of time to compete with the polymer for the transition metal crosslinker, thereby reducing the viscosity of the fluid. Next, the gelled fluid is injected into the well bore and into contact with the formation under sufficient pressure to fracture the formation. The delayed release breaker is released over a predetermined time interval to break the gelled fluid. The system is effective at lower temperatures, i.e. below about 250° F., and particularly at temperatures below about 150° F.

Preferably, the delayed release breaker is a phosphonate compound based on 1-hydroxyethylidene-1,1-diphosphonic acid or its salts which can be mono, di, tri or tetra alkali metal (sodium or potassium) or ammonium ions.

Other phosphonates include aminotri (methylenephosphonic acid), hexamethylenediaminetetra (methylenephosphonic acid) or diethylenetriaminepenta (methylenephosphonic acid) or the alkali metal or ammonium salts of these phosphonic acids. Other phosphonic acids or their alkali metal or ammonium salts are those based on aminomethylenephophonates.

In order to achieve the desired time release for the breaker, the chelating agent is initially bound or encapsulated in some manner, such as by encapsulation or by absorbing the chelant onto a suitable zeolite or carrier substrate.

Additional objects, features and advantages will be apparent in the written description which follows.

DETAILED DESCRIPTION OF THE INVENTION

The present invention is an improved fracturing fluid and a method of fracturing an oil bearing formation. In order to practice the method of the invention, an aqueous fracturing fluid is first prepared by blending a hydratable polymer into an aqueous base fluid. The aqueous base fluid can be, e.g., water or brine. Any suitable mixing apparatus may be used for this procedure. In the case of batch mixing, the hydratable polymer and aqueous fluid are blended for a period of time which is sufficient to form a hydrated sol. The hydratable polymer useful in the present invention can be any of the hydratable polysaccharides familiar to those in the well service industry which are capable of gelling in the presence of a crosslinking agent to form a gelled fluid.

Suitable hydratable polysaccharides are, for example, the galactomannan gums, glucomannan gums, guars, derived guars and cellulose derivatives. Specific examples of hydratable polysaccharides are guar gum, guar gum derivatives, locust bean gum, karaya gum, carboxymethyl cellulose, carboxymethyl hydroxyethyl cellulose, and hydroxyethyl cellulose. The preferred hydratable polymers of the invention are guar gum, carboxymethyl guar, hydroxypropyl guar, carboxymethylhydroxypropyl guar, and carboxymethylhydroxyethyl cellulose. The most preferred hydratable polymers for the present invention are guar gum, carboxymethyl guar and carboxmethyl hydroxypropyl guar.

The hydratable polymer is added to the aqueous base fluid in concentrations ranging from about 0.10% to 5.0% by weight of the aqueous fluid. A preferred range for the present invention is between about 0.20% to 0.80% by weight.

In addition to the hydratable polymer, the fracturing fluids of the invention include a transition metal crosslinking agent suitable for crosslinking the hydratable polymer to form a polymer gel. The preferred crosslinking agents for the hydratable polymers of the invention are zirconium and titanium containing compounds and complexes including the so-called organotitanates and zirconates. See for example, U.S. Pat. No. 4,514,309, issued Apr. 30, 1985, and U.S. Pat. No. 5,497,830, issued Mar. 12, 1996, and assigned to the assignee of the present invention. These transition metal crosslinkers are preferably zirconium or titanium compounds reacted with polyfunctional organic acids. Examples of suitable crosslinkers include zirconium triethanolamine, zirconium acetate, zirconium lactate, zirconium lactate triethanolamine, zirconium malate, zirconium citrate, titanium lactate, titanium malate, titanium citrate, titanium triethanolamine, titanium acetylacetonate, and the like. An appropriate amount of crosslinker is added to achieve the desired level of viscosity in the gelable fluid. The crosslinker is generally present in the range from about 0.001% to in excess of 0.05% by volume, based upon the volume of the total aqueous fracturing fluid.

Propping agents are typically added to the base fluid and hydratable polymer mixture prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 8 pounds per gallon of fracturing fluid composition but higher or lower concentrations can be used as required. The base fluid can also contain other conventional additives common to the well service industry such as surfactants, gel stabilizers and buffers, and the like.

Once the gelled fluid having the proppant therein is injected into the well bore and time is allowed for fracturing to occur, it is advantageous to then reduce the high viscosity of the gelled fluid. In the present invention, this is accomplished by the timed-release of a delayed release breaker that is incorporated within the gelable fracturing fluid.

The preferred delayed release breaker utilized in the fluids of the invention is a chelating agent. Examples of chelating agents include simple phosphates, the salts of ethylenediaminetetraacetic acid (EDTA), citric acid, aminotricarboxylic acid and its salts, polyphosphonated and polyphosphated compounds and salts of phosphonic acid. The preferred chelating agents useful as delayed breakers of the invention are based on 1-hydroxyethylidene-1,1-diphosphonic acid or its salts which can be mono, di, tri or tetra alkali metal (sodium or potassium) or ammonium ions. The preferred chelating agents of the invention are thus more complex multivalent chelators as opposed to the simple phosphates, for example.

Other organo phosphonates suitable for purposes of the present invention include aminotri (methylenephosphonic acid), hexamethylenediaminetetra (methylenephosphonic acid) or diethylenetriaminepenta (methylenephosphonic acid) or the alkali metal or ammonium salts of these phosphonic salts. Other phosphonic acids or their alkali metal or ammonium salts are those based on aminomethylenephosphonates. The most preferred chelating agent is a commercially available hydroxyethylidene-1,1-diphosphonic acid or its salts or mixture thereof.

The present systems are also distinguishable in that they constitute non-acidic fracturing fluids in the most preferred form. The pH level of a solution of phosphonate can be adjusted by either adding a base such as NaOH, or by adding the appropriate amounts of the various pre-prepared salts of the phosphonate. The phosphonates are stable at 100–200° F., thus suitable for the temperature ranges envisioned for the present systems. While the systems of the invention are suitable for use up to about 250° F., they are preferred for use at temperatures below about 200° F. most preferably 150° or below. Since phosphonic acid will chelate readily with various metal ions of the type under consideration, its salts make excellent candidates for the breakers of the invention.

In order to provide the timed release necessary for the purposes of the present invention, the chelating agent must be initially bound or encapsulated in some fashion. One method for initially binding the chelant is to encapsulate the chelant within a pellet having a coating to allow the chelating agent therein to be slowly released once within the formation.

The chelant must be processed into a useable form, for example by compacting, to form a pellet. The pellets can be processed by any method used to granulate particles including compaction or agglomeration. A typical compaction process forces a solvated slurry through a heated die. Afterward, the extrudant is continuously severed at the die's discharge port. The frequency of cutting and die's port diameter can be adjusted to control the particle size. The particles are then tumbled, dried and sieved.

The agglomeration process can be conducted in a fluidized bed. Regulating the air flow through the bed while top spraying the powder with a binder solution is frequently used to granulate the mixtures. The binder's spray rate through the nozzle and the air flow through the bed are frequently adjusted to produce particles of desirable size. The binder solution, usually an aqueous water soluble polymer solution, is chosen that will maximize the particle's integrity.

A dissolvable or permeable coating is then typically applied to the agglomerated pellet. The coating can be one which is permeable to at least one fluid, typically water, found in the formation. Also, the method of encapsulation may be such that increased pressure within the formation and during fracturing will cause the pellet to rupture, thus releasing the chelating agent.

The material most preferred for encapsulating the chelating agent to form the pellet will vary depending upon a variety of conditions. Among the factors are the physical and chemical properties of the chelating agent (pH, etc.), the operating conditions (temperature and pressure, amount and type of base fluid used in the fracturing process) to which the pellet is exposed, and the desired time-delay. For example, the amount of stress created by the closure of the formation as well as the desired time for release after injection of the pellets should be considered in selecting the most preferred enclosure member for a given fracturing procedure.

Representative encapsulating materials having the desired water permeability include various polymers homopolymers and copolymers of ethylenically unsaturated monomers such as ethylene, propylene, isobutylene, vinyl chloride, vinylidene chloride, styrene, ethyl cellulose and cellulosic materials of similar properties, and vinyl acetate. In addition, hydrocarbon waxes, polymers of ethylene oxide, propylene oxide, polycarbonates or combinations thereof, can also be employed as the coating for the pellets. Preferred materials for use as the encapsulating material for the pellets are polyethylene, polypropylene, polyisobutylene, polyvinylacetate, copolymers of vinyl chloride and vinylidene chloride, copolymers of styrene and butadiene, copolymers of ethylene and an unsaturated carboxylic acid and/or salt thereof such as acrylic acid or its sodium salt and copolymers of ethylene and vinyl acetate.

The permeability, as well as, to a lesser extent, the thickness and elasticity, of the pellet determines the rate at which the environmental water can be imbibed into the pellet followed by rupture of the pellet and/or release of the delayed-breaker. The water permeability of the encapsulating material used can vary widely. For example, a highly water permeable cellulosic material such as cellulose acetate or cellulose acetate butyrate can be used if applied with sufficient thickness over the chelating agent.

The delayed release breaker pellets can also be made such that the barrier film around the chelating agent surrounds one or more particles of active liquid or solid material. For example, the pellets can be prepared as mononuclear particles having a liquid or solid core of the breaker encapsulated by the encapsulating material, as a mononuclear core having a multiple wall enclosure member, or as a polynuclear core wherein each core is encapsulated by a permeable enclosure member but agglomerated or otherwise attached to form a single particle. Of the various particle configurations, the controlled release capsule is preferably prepared having a mononuclear core with the liquid or solid breaker encapsulated within a single layer of the permeable material. The pellets of encapsulated chelating agent can be of essentially any shape, including spherical, cubic, or irregular, with generally spherical beads such as prepared in a fluidizing bed process being preferred.

Various methods can be employed for applying the desired coating to the pelletized chelant such as a fluidized bed process wherein the chelating agent is sprayed with a suitable permeable material which is suspended in a rapid flow of air or other gas. Some illustrative patents using this method are in U.S. Pat. Nos. 3,237,596 and 3,382,093. While the fluidized bed method is the preferred method in coating solid chelating agent, liquid chelating agent can also be encapsulated, particularly if the liquid is frozen prior to the fluidization process or absorbed onto porous particles such as fired clay or other siliceous materials. Other coating processes such as gas phase separation, coacerbation and acoustic levitation can also be employed in preparing the delayed-breaker pellets. Preferably, the coating operation is conducted such that individual pellets do not stick together. The thickness of the encapsulating material film on the chelating agent is typically from about 0.5 to 100 $\mu$m, and preferably from about 5 to 60 $\mu$m.

The concentration of chelating agent is typically in the range from about 1 to 75% of the pellet's weight. Pellets having, for example, a 12% coating and approximate active acid content of 21% are preferably added in the range from about 0.5 to 5 lbs. per thousand gallons, most preferably about 2.5 lbs. per thousand gallons.

The pellets of the invention can also contain activators such as ionic iron and copper species, which are effective at increasing the rate of viscosity reduction. Any iron or copper complexes that are soluble in aqueous solutions will promote an oxidative rate enhancement and thus promote chelation of the dissociated or partially dissociated metal from the polymer. Compounds such as iron(III)EDTA or copper(II)EDTA are effective rate enhancers at concentrations ranging from 1 to 50% by weight based on the weight of the pellet.

Further, the chelating agent may be immobilized in other ways such as by introducing the chelant into a zeolite structure which can, in a time-released fashion, ion exchange the chelating agent out within the formation. Preferably, a zeolite capable of immobilizing an anionic chelating agent is employed that will hold the largely anionic chelating agents within the pore space of the zeolites. Further, the zeolite should preferably be of such a pore size as to allow larger molecules such as EDTA to fit within. Generally, the type of zeolite used will depend upon the type of chelating agent employed, and other conditions within the formation and the gelled fluid. For the purposes of the present invention, the zeolite is acceptable if it provides a timed release of the chelant over about an 8 to 24 hour time period to effectively break the crosslinked fluid and reduce the viscosity to less than about 100 centipoise as measured by the Brookfield viscometer method.

Another technique for binding the chelating agent would be to apply the liquid form of the chelant to a calcined diatomaceous earth subtrate. Other binding or encapsulating techniques will be apparent to those skilled in the relevant arts.

Tables I an II which follow illustrate the advantages to be gained through the use of the improved break mechanism of the invention. Table I illustrates the retained conductivity obtained with a traditional fracturing fluid using an encapsulated oxidant breaker (potassium persulfate) while Table II illustrates the same basic fluid but with 2 lbs. per thousand gallons (ppt) of the encapsulated chelating agent of the invention added. As shown in Table II, significant improvement in the retained conductivity was observed in laboratory testing. The particular chelating agent utilized (Encap 81105, Fritz Industries, Inc., Mesquite, Tex.)) is the tetrasodium salt of the phosphonic acid (hydroxyethylidene diphosphonic acid) having a 12% nylon coating and having a core which is approximately 40% active.

TABLE I

Conductivity Analysis

| Width Core Top | 10.06 | Fluid | 80 | mls |
| Width Core Bottom | 8.72 | Proppant | 63 | grams |
| Width Pack, initial | 0.220 | | | |
| Fluid | 0.19% (wt) of carboxymethyl guar; 0.1% (vol) 50% aq. tetramethyl ammonium chloride and 0.1% (vol) of zirconium lactate solution containing 6.0% (wt) ZrO$_2$; pH to 11 with NaOH | | | |
| Additives | 0.048% (wt) potassium persulfate encapsulated with 12% of a nylon coating | | | |

| Test Data Time (hrs) | Temp °F. | Temp °C. | Rate mls/min | Viscosity cp | DP psi | Width inches | Conductivity md/ft | darcies | Clousure psi | Regain % |
|---|---|---|---|---|---|---|---|---|---|---|
| 0 | 102.07 | 38.93 | 7.02 | 0.67 | 3.83919 | 0.222 | 33 | 2 | 2000 | 1% |
| 10 | 101.75 | 38.75 | 7.98 | 0.67 | 7.00522 | 0.220 | 20 | 1 | 2000 | 1% |
| 20 | 101.84 | 38.80 | 7.98 | 0.67 | 6.07571 | 0.218 | 23 | 1 | 2000 | 1% |
| 30 | 101.83 | 38.79 | 5.98 | 0.67 | 1.96802 | 0.216 | 54 | 3 | 2036 | 1% |
| 40 | 101.86 | 38.81 | 5.98 | 0.67 | 1.63381 | 0.216 | 65 | 4 | 2033 | 2% |
| 50 | 102.13 | 38.96 | 5.98 | 0.67 | 1.54254 | 0.260 | 69 | 3 | 2034 | 2% |

TABLE II

Conductivity Analysis

| Width Core Top | 10.360 | Fluid | 80 | mls |
| Width Core Bottom | 10.00 | Proppant | 63 | grams |
| Width Pack, initial | 0.220 | | | |
| Fluid | 0.19% (wt) of carboxymethyl guar; 0.1% (vol) 50% aq. tetramethyl ammonium chloride and 0.1% (vol) of zirconium lactate solution containing 6.0% (wt) ZrO$_2$; pH to 11 with NaOH | | | |
| Additives | 0.048% (wt) postassium persulfate encapsulated with 12% of a nylon coating and 0.03% (wt) Encap 81105 (12% coating) | | | |

| Test Data Time (hrs) | Temp °F. | Temp °C. | Rate mis/min | Viscosity cp | DP psi | Width inches | Conductivity md/ft | darcies | Closure psi | Regain % |
|---|---|---|---|---|---|---|---|---|---|---|
| 0 | 102.01 | 38.89 | 5.42 | 0.67 | 0.12523 | 0.223 | 773 | 42 | 2000 | 20% |
| 10 | 101.74 | 38.74 | 8.00 | 0.67 | 0.14838 | 0.220 | 966 | 53 | 1986 | 25% |
| 20 | 101.82 | 38.79 | 8.00 | 0.67 | 0.10392 | 0.217 | 1,378 | 76 | 1961 | 36% |
| 30 | 101.80 | 38.78 | 6.01 | 0.67 | 0.05519 | 0.216 | 1,947 | 108 | 2000 | 52% |
| 40 | 101.75 | 38.75 | 6.01 | 0.67 | 0.05066 | 0.216 | 2,122 | 118 | 2000 | 56% |
| 50 | 102.20 | 38.00 | 6.00 | 0.67 | 0.04383 | 0.216 | 2,441 | 136 | 2000 | 65% |

While the laboratory tests above utilized the encapsulated chelant as a companion breaker for a traditional oxidant breaker, it will be understood that the chelant breaker system of the invention can be utilized as a stand-alone breaker system, as well.

An invention has been provided with several advantages. The fracturing fluids of the invention are effective for use in relatively low temperature environments and at relatively high pH ranges. The fluids utilize a unique breaking mechanism which completely and efficiently breaks the fluid in a timed fashion. The resulting retained conductivity of the formation is improved. Fluids can be formulated without the presence of traditional oxidants, or the chelant breaker can be utilized as a companion breaker material for traditional oxidant breaker systems.

While the invention has been shown in only one of its forms, it is not thus limited but is susceptible to various changes and modifications without departing from the spirit thereof.

What is claimed is:

1. A method of fracturing a zone of a subterranean formation penetrated by a well bore, comprising the steps of:
   forming a gelable fracturing fluid by combining an aqueous base fluid and a hydratable polymer, the pH of the gelable fracturing fluid being in the range from about 8.0–12.0;
   adding a transition metal crosslinker to the aqueous base fluid for crosslinking the hydratable polymer to form a gelled fluid of sufficient viscosity to facilitate fracturing of the formation;
   injecting the gelled fluid into the well bore and into contact with the formation under sufficient pressure to fracture the formation, wherein the temperature of the formation is below about 150° F.;
   wherein the gelable fracturing fluid has incorporated therein as a primary break mechanism a delayed release breaker consisting essentially of a chelating agent that is separately encapsulated, the chelating agent having a dissolvable coating which will allow the chelating agent therein to be slowly released once within the formation over a period of time to compete with the polymer for the transition metal crosslinker, thereby reducing the viscosity of the fluid; and
   wherein the chelating agent is selected from the group consisting of hydroxyethylidene-1,1-diphosphonic acid and salts thereof, aminotri (methylenephosphonic acid) and salts thereof, hexamethylenedi-aminetetra (methylenephosphonic acid) and salts thereof, diethylenetriaminepenta (methylenephosphonic acid) and salts thereof, phosphonic acids and salts based upon methylenephosphonate and mixtures of the foregoing.

2. A method of fracturing a zone of a subterranean formation penetrated by a well bore, comprising the steps of:
   forming a gelable fracturing fluid by combining an aqueous base fluid and a hydratable polymer, the pH of the gelable fracturing fluid being in the range from about 3.0–12.0;
   adding a transition metal crosslinker to the aqueous base fluid for crosslinking the hydratable polymer to form a gelled fluid of sufficient viscosity to facilitate fracturing of the formation;
   injecting the gelled fluid into the well bore and into contact with the formation under sufficient pressure to fracture the formation; and
   wherein the gelable fracturing fluid has incorporated therein as a primary break mechanism a delayed release breaker comprising a chelating agent that is released slowly over a period of time to compete with the polymer for the transition metal crosslinker, thereby reducing the viscosity of the fluid; and
   wherein the chelating agent is absorbed onto the surface of a zeolite and allowed to slowly leach out into the fluid with time to compete with the polymer for the crosslinker.

3. The method of claim 2, wherein the chelating agent is selected from the group consisting of hydroxyethylidene-1,1-diphosphonic acid and salts thereof, aminotri (methylenephosphonic acid) and salts thereof, hexamethylenedi-aminetetra (methylenephosphonic acid) and salts thereof, diethylenetriaminepenta (methylenephosphonic acid) and salts thereof, phosphonic acids and salts based upon methylenephosphonate and mixtures of the foregoing.

4. The method of claim 1, wherein the metal crosslinker is selected from the group consisting of zirconium and titanium.

5. The method of claim 1, wherein the encapsulated chelant also comprises a compound selected from the group consisting of iron(III)EDTA and copper(II)EDTA.

6. The method of claim 5, wherein the encapsulated chelant also comprises sodium silicate.

7. The method of claim 1, wherein the hydratable polymer is selected from the group consisting of hydratable polysaccharides and guar gums.

8. A method of fracturing a zone of a subterranean formation penetrated by a well bore, comprising the steps of:
   forming a gelable fracturing fluid by combining an aqueous base fluid and a hydratable polymer, the pH of the gelable fracturing fluid being greater than about 8.0;
   adding a transition metal crosslinker to the aqueous base fluid for crosslinking the hydratable polymer to form a gelled fluid of sufficient viscosity to facilitate fracturing of the formation;
   adding to the fluid, as a primarily breaker, a traditional encapsulated oxidant breaker;
   injecting the gelled fluid into the well bore and into contact with the formation under sufficient pressure to fracture the formation, wherein the temperature of the formation is below about 200° F.;
   wherein the gelable fracturing fluid has incorporated therein as a companion breaker for the encapsulated oxidant a delayed release breaker comprising a chelating agent that is separately encapsulated from the encapsulated oxidant, the chelating agent having a dissolvable coating which will allow the chelating agent therein to be slowly released once within the formation over a period of time to compete with the polymer for the transition metal crosslinker, thereby reducing the viscosity of the fluid; and wherein the chelating agent is selected from the group consisting of hydroxyethylidene-1,1-diphosphonic acid and salts thereof, aminotri (methylenephosphonic acid) and salts thereof hexamethylenedi-aminetetra (methylenephosphonic acid) and salts thereof, diethylenetriaminepenta (methylenephosphonic acid) and salts thereof, phosphonic acids and salts based upon methylenephosphonate and mixtures of the foregoing.

9. A method of fracturing a zone of a subterranean formation penetrated by a well bore, comprising the steps of:

forming a gelable fracturing fluid by combining an aqueous base fluid and a hydratable polymer, the pH of the gelable fracturing fluid being greater than about 7.0;

adding a transition metal crosslinker to the aqueous base fluid for crosslinking the hydratable polymer to form a gelled fluid of sufficient viscosity to facilitate fracturing of the formation;

adding to the fluid, as a primary breaker, a traditional encapsulated oxidant breaker;

injecting the gelled fluid into the well bore and into contact with the formation under sufficient pressure to fracture the formation, wherein the temperature of the formation is at or below about 200° F.; and wherein the gelable fracturing fluid has incorporated therein as a companion breaker for the encapsulated oxidant a delayed release breaker comprising a chelating agent that is released slowly over a period of time to compete with the polymer for the transition metal crosslinker, thereby reducing the viscosity of the fluid; and wherein the chelating agent is absorbed onto the surface of a zeolite and allowed to slowly leach out into the fluid with time to compete with the polymer for the crosslinker.

10. The method of claim 9, wherein the chelating agent is selected from the group consisting of hydroxyethylidene-1,1-diphosphonic acid and salts thereof, aminotri (methylenephosphonic acid) and salts thereof, hexamethylenedi-aminetetra (methylenephosphonic acid) and salts thereof, diethylenetriaminepenta (methylenephosphonic acid) and salts thereof, phosphonic acids and salts based upon methylenephosphonate and mixtures of the foregoing.

11. The method of claim 8, wherein the metal crosslinker is selected from the group consisting of zirconium and titanium.

12. The method of claim 8, wherein the encapsulated chelant also comprises a compound selected from group consisting of iron(III)EDTA and copper(II)EDTA.

13. The method of claim 8, wherein the pellet also comprises sodium silicate.

14. The method of claim 8, wherein the hydratable polymer is selected from the group consisting of hydratable polysaccharides and guar gums.

15. A fracturing fluid comprising:

an aqueous base fluid, a hydratable polymer, a transition metal crosslinker, a proppant, and a delayed-breaker, the delayed release breaker comprising an organo phosphonate chelating agent that is released slowly over a period of time to compete with the polymer for the cross-linker, thereby reducing the viscosity of the fluid; and wherein the chelating agent is absorbed onto the surface of a zeolite and allowed to slowly leach out into the fluid with time to compete with the polymer for the crosslinker.

16. The fluid of claim 15, wherein the pH of the gelable fracturing fluid is greater than about 7.0.

17. The fluid of claim 15, wherein the temperature of the formation is at or below about 250° F.

18. The fluid of claim 15, wherein the chelating agent is selected from the group consisting of hydroxyethylidene-1,1-diphosphonic acid and salts thereof, aminotri (methylenephosphonic acid) and salts thereof, hexamethylenedi-aminetetra (methylenephosphonic acid) and salts thereof, diethylenetriaminepenta (methylenephosphonic acid) and salts thereof, phosphonic acids and salts based upon methylenephosphonate and mixtures of the foregoing.

19. The fluid of claim 15, wherein the metal crosslinker is selected from the group consisting of zirconium and titanium.

20. The fluid of claim 15, wherein the chelating agent is encapsulated into a pellet having a coating to allow the chelating agent therein to be slowly released once within the formation.

21. The fluid of claim 20, wherein the pellet also comprises a compound selected from the group consisting of iron(III)EDTA and copper(II)EDTA.

22. The fluid of claim 20, wherein the pellet also comprises sodium silicate.

23. The fluid of claim 15, wherein the hydratable polymer is selected from the group consisting of hydratable polysaccharides and guar gums.

* * * * *